Feb. 21, 1967 C. L. WHITEFORD 3,305,124
TRAY ASSEMBLY
Filed Oct. 20, 1965 3 Sheets-Sheet 1

INVENTOR.
CARLTON L. WHITEFORD
BY
ATTORNEY

Feb. 21, 1967   C. L. WHITEFORD   3,305,124
TRAY ASSEMBLY
Filed Oct. 20, 1965   3 Sheets-Sheet 2

INVENTOR.
CARLTON L. WHITEFORD
BY
*Peter L. Costas*
ATTORNEY

United States Patent Office 3,305,124
Patented Feb. 21, 1967

3,305,124
TRAY ASSEMBLY
Carlton L. Whiteford, New Canaan, Conn., assignor to Poly-Pak Corporation of America, Springdale, Conn., a corporation of Delaware
Filed Oct. 20, 1965, Ser. No. 498,686
9 Claims. (Cl. 220—63)

The present invention relates to tray assemblies and more particularly to a novel compartmented tray assembly of synthetic plastic material having a disposable food receiving portion.

In feeding a large number of people, trays are oftentimes employed. Time and expense are required for preparation of food on trays and for cleaning and storing the trays after the meal has been completed. To reduce the breakage problem and to reduce the weight in air transportation, synthetic plastics have been widely adopted for trays and/or for food receptacles carried on such trays. However, the detergents and high temperatures required for washing and sterilizing such trays and receptacles result in their deterioration, requiring relatively frequent replacement. In addition, the utensils tend to mar or scuff the surfaces of the plastic material so that airlines and others frequently employ disposable doilies to decorate the surface of the trays.

It is an object of the present invention to provide a novel tray assembly having a compartmented tray member of relatively rigid synthetic plastic and disposable relatively flexible plastic food receptacles that may be removed readily from the tray member.

It is also an object to provide such a tray assembly which is light in weight and which may be conveniently and economically manufactured from thermoplastic sheet materials.

Another object is to provide such a tray assembly wherein food may be placed in receptacles on the tray member and left-over food in the receptacles may be disposed of in the receptacles themselves, and wherein the tray member may be reused after a minimum of cleaning.

A specific object is to provide such a tray assembly that has a flexible cover for the entire surface of the tray and having portions therein wherein the food is placed, so that, after use, the cover may be removed from the tray member and used as a disposal container for the leftover food and the tray member may be reused without extensive cleaning or sterilization.

Other objects and advantages will be readily apparent from the following detailed specification and claims and the drawings appended hereto wherein:

Figure 1:
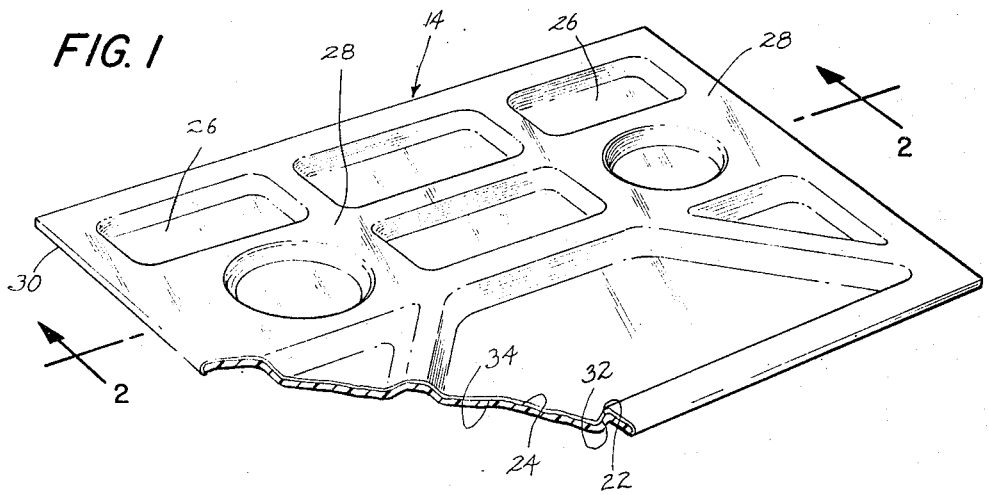
FIGURE 1 is a perspective view of a tray assembly illustrating one embodiment of the present invention, with a portion broken away exposing component parts, having a compartmented tray member and a cover with food receiving dish portions formed therein and which overlies over the entire top surface of the tray member.

It has now been found that the foregoing and related objects can be readily attained in a tray assembly comprising a tray member of relatively rigid synthetic plastic material having a pocket formed therein with side and bottom walls; and a food receptacle of relatively flexible synthetic plastic sheet material having a food receiving dish portion closely conforming to the side and bottom walls of the pocket. In this manner, the side and bottom walls of the pocket provide peripheral and underlying support for the dish portion and reinforce it against the weight of food placed therein. These individual receptacles are normally held in place within the pockets by the weight of the receptacle and the contents thereof although adhesive means and mechanical interengagement may also be employed.

Although injection molding from thermoplastic materials and compression molding from thermosetting materials may be used to form the parts of the tray assembly into the desired configuration, the present invention is particularly adapted to thermoforming from thermoplastic sheet materials. In this manner, relatively high strength and desirably oriented sheet material may be employed at relatively low cost to provide low cost, readily formed components, thus permitting the use of disposable food receptacles.

As will be readily appreciated, the tray member may be fabricated into a compartmented structure having a plurality of pockets. The web portion between the pockets may be printed or otherwise surface decorated to provide a pleasing appearance. In addition, the web portion may be corrugated or embossed for increased strength and to minimize scuffing and marring of the surface by utensils and the like and this is particularly advantageous with printing of a design in the valleys of the corrugations and the use of separate receptacles. Where a cover is employed, this should be sufficiently transparent to enable viewing of the decorated surface.

In one embodiment of this invention, a cover of flexible plastic sheet material overlies the entire top surface of the tray member and is integrally formed with food receiving dish portions that extend into and closely conform to the shape of the pockets of the tray member so as to receive support therefrom as the dish portions of the cover are not of sufficient rigidity to hold the food without deformation and receive this necessary support from the pockets in the tray member. The pockets in the tray member and the dish portions formed in the cover may have any desired configuration convenient for the reception of food, however, a flat base may be used for convenient stacking of the tray members. Although the cover may be held in place by friction, gravity, static attraction or adhesive means, it is conveniently secured thereto by interengaging portions such as a peripheral lip portion on the cover which engages upon the peripheral edge portion of the tray member. Food may be placed in the receptacles of the cover when the cover is secured to the tray member; and after the meal has been completed, the cover may be conveniently stripped or peeled from the tray member and used as a receptacle for the disposal of leftovers.

In another embodiment of this invention individual receptacles of relatively flexible plastic material may have food receiving dish portions which extend into and closely conform to the shape of the pockets in the tray member. To facilitate insertion and removal from the pockets, the individual receptacles have a peripheral rim portion of the receptacle extending outwardly of the pockets and above the surrounding web portion of the tray member. This rim portion not only functions as a convenient area that may be grasped in order to insert or remove the receptacles from the pockets in the tray member but also acts as a barrier to prevent food from falling into the pockets and is desirably reversely curved to give the receptacle the appearance of thickness and to strengthen the edge portion. It can be seen that only those receptacles that will actually be used for each meal are inserted into the pockets and the other pockets may be left empty. When the meal has been completed, the relatively inexpensive receptacles may be disposed of individually while still containing leftover food particles so that the tray member may be reused with only a minimum of cleaning.

Although individual receptacles may be held in the pockets of the tray member by their own weight and that of any food placed therein, additional engagement may be desirable for use in aircraft and other conveyances to ensure that the receptacles are not jolted out of the pockets by movements of the tray member. Interengaging portions may be formed in both the receptacles and the tray member. In another manner, an adhesive may be placed in the pockets of the tray member, desirably one which has lesser adhesion to the receptacle than to the tray member or one that is water soluble. The receptacles may also be held in engagement with the pockets of the tray member by making the tray member of a material that has or may be provided readily with an ionic charge on its surface and by making the receptacle from a material that has or may be provided readily with the opposite ionic charge on its surface. Such static effects are inherent in certain thermoplastic sheet materials and also may be developed by electrostatic treatments and use of anionic and cationic agents as for example in detergents.

Figure 2:
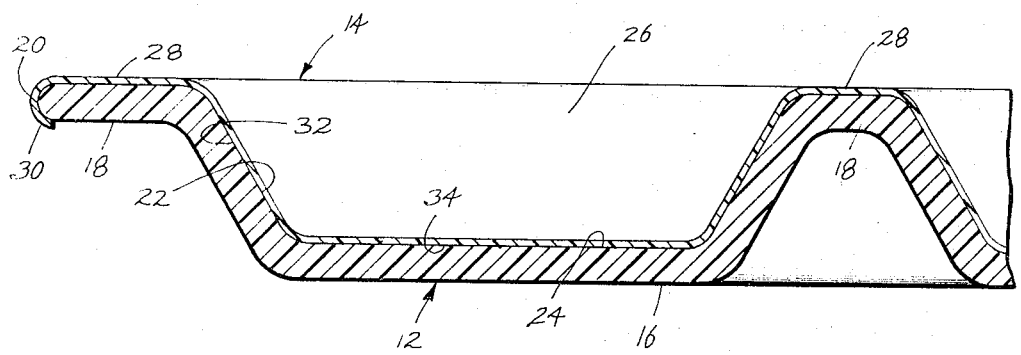
FIGURE 2 is a fragmentary sectional view to an enlarged scale along line 2—2 of FIGURE 1.
Figure 3:
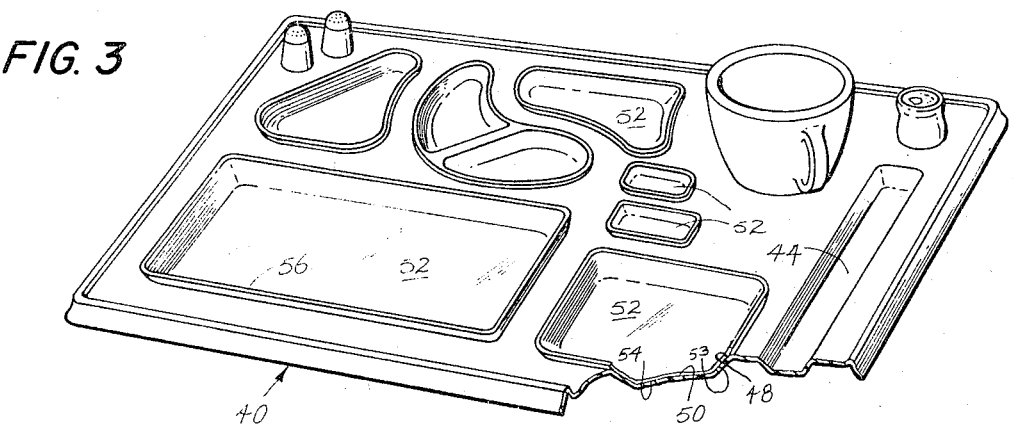
FIGURE 3 is a perspective view of another embodiment of the present invention illustrating a tray assembly, with a portion broken away exposing component parts, having individual receptacles supported by pockets in the tray member.
Figure 4:
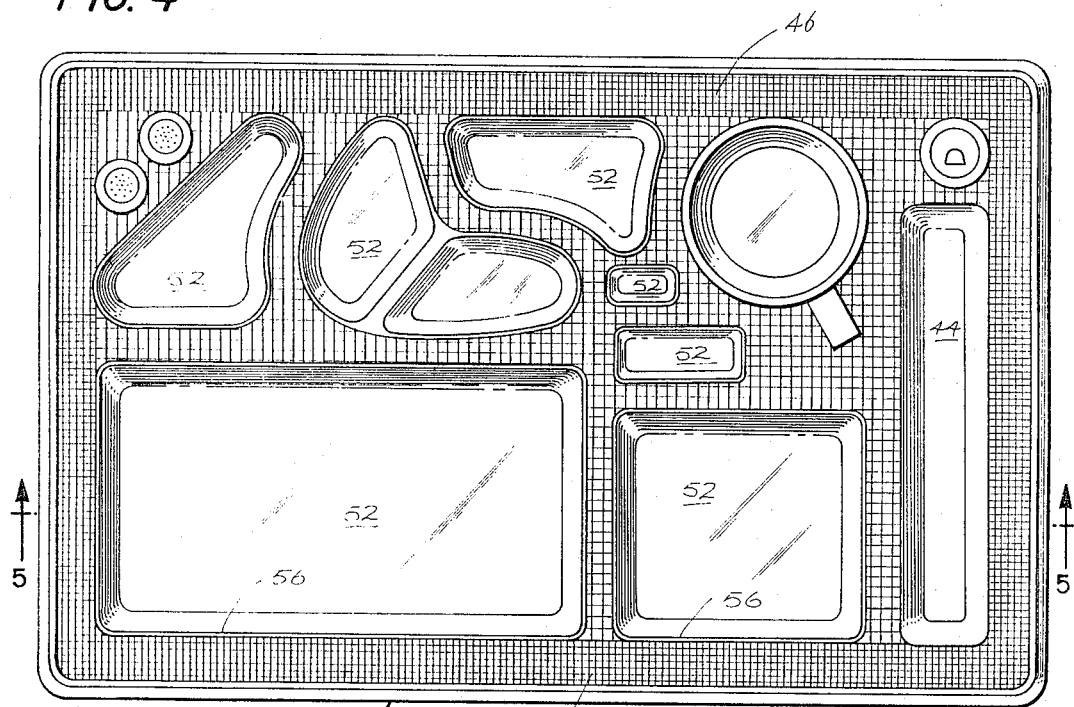
FIGURE 4 is a plan view of the tray assembly of FIGURE 3 to an enlarged scale.
Figure 5:
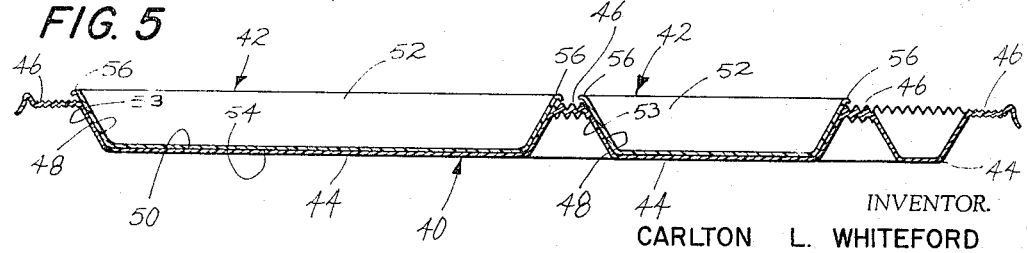
FIGURE 5 is a sectional view along line 5—5 of FIGURE 4.
Figure 6:
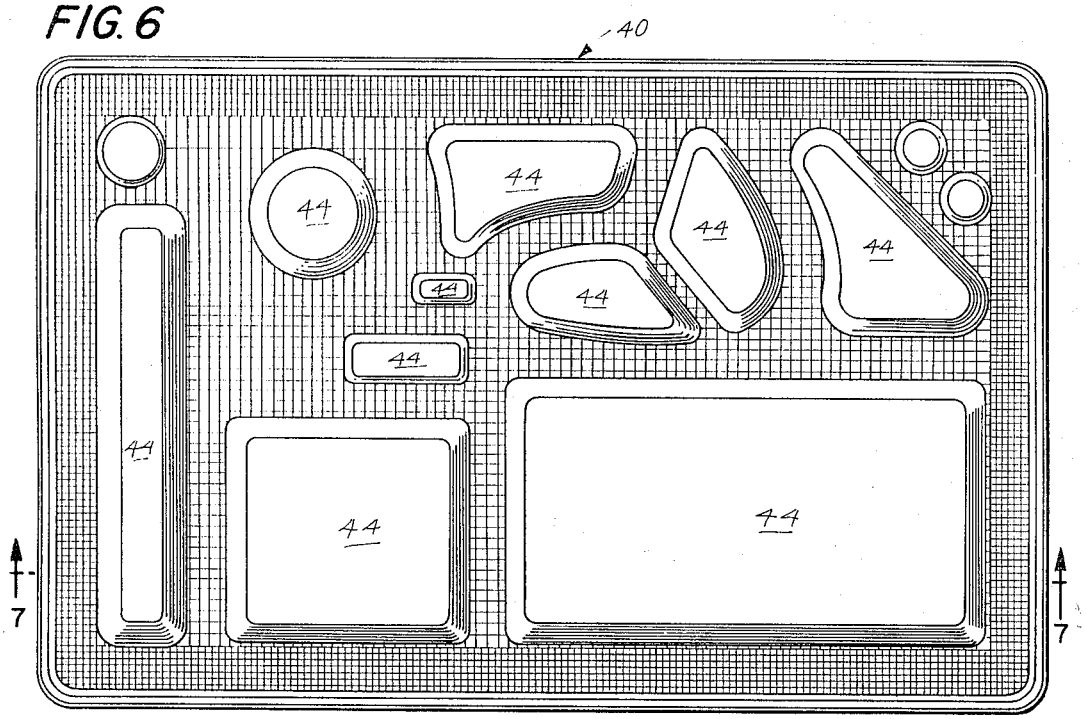
FIGURE 6 is a bottom view of the tray assembly of FIGURE 3 to an enlarged scale.
Figure 7:
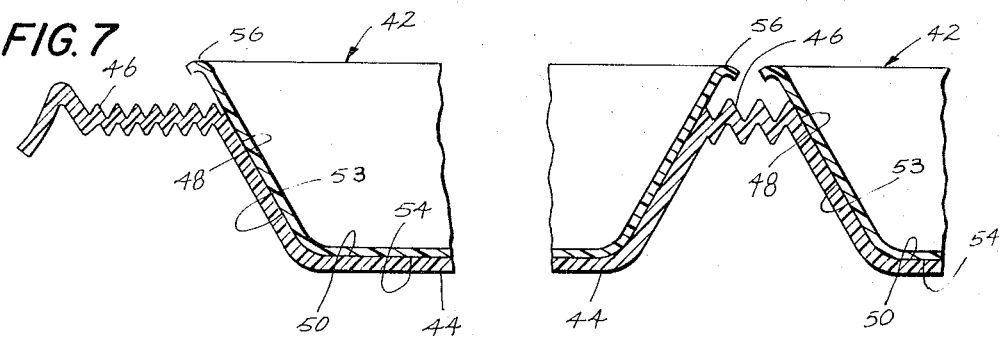
FIGURE 7 is a greatly enlarged fragmentary sectional view along the line 7—7 of FIGURE 6.
Figure 8:
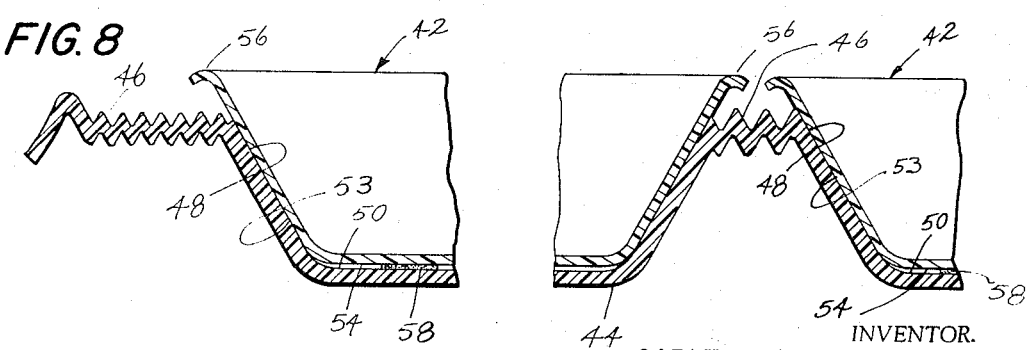
FIGURE 8 is a fragmentary sectional view of a tray assembly similar to FIGURE 7 having an adhesive between the tray member and the receptacle.

Referring now in detail to the attached drawing, FIGURES 1 and 2 illustrate an embodiment of the present invention wherein a tray assembly has a relatively rigid, synthetic thermoplastic tray member generally designated by the numeral 12 and a flexible food receptacle or cover of synthetic thermoplastic sheet material generally designated by the numeral 14 overlying the tray member 12. The tray member 12 is integrally formed with a multiplicity of pockets 16, a web portion 18 which lies substantially in one plane and peripheral edge portion 20. The pockets 16 have side walls 22 and bottom walls 24 which extend below the web portion 18 and the bottom walls 24 extend in a plane substantially parallel to that of the web portion 18.

The cover 14 is integrally formed and has food receiving dish portions 26 connected by a generally planar web portion 28 overlying closely the web portion 18 of the tray member 12. Extending about its periphery is a reversely curved lip portion 30 which curves around and flexibly engages the peripheral edge 20 of tray member 12 so as to provide some mechanical interengagement therebetween. The food receiving dish portions 26 are formed with side walls 32 and bottom walls 34 which extend into and closely conform to the shape of the side walls 22 and bottom walls 24 of the pockets 16 and thereby receive peripheral and underlying support therefrom. Similarly, the web portion 28 of the cover 14 receives underlying support from the web portion 18 of the tray member 12 which may have a design printed thereon for use with a cover 14 of a transparent material. The cover 14 may be removed readily from the tray member 12 by disengaging the peripheral lip portion 30 from the peripheral edge 20 at one point and then peeling or stripping the remainder thereof from the surface of the tray member 12. Thus it can be seen that the cover 14 may be fabricated from relatively inexpensive flexible thermoplastic sheet material since it receives support from tray member 12 and may be easily removed and used as a disposal container for leftover food in the dish portions 26, whereby the tray member 12 may then be reused without extensive cleaning.

In FIGURES 3–7, there is illustrated another embodiment of the present invention wherein the tray assembly has a relatively rigid, synthetic plastic tray member generally designated by the numeral 40 and a plurality of removable relatively flexible plastic receptacles generally designated by the numeral 42. The tray member 40 is integrally formed with a plurality of pockets 44 and a connecting web portion 46 which extends substantially in one plane. In the illustrated embodiment, the web portion 46 is embossed and desirably may be printed in the valleys of the embossments with the ridges protecting the printing from abrasion. The pockets 44 have side walls 48 and bottom walls 50 which extend below the web portion 46 and the bottom walls 50 extend in a plane substantially parallel to that of the web portion 46.

The receptacles 42 have food receiving dish portions 52 with side walls 53 and bottom walls 54 extending into and closely conforming to the shape of side walls 48 and bottom walls 50 of pockets 44 and receiving peripheral and underlying support therefrom. Extending about the upper periphery of the receptacles 42 are rim portions 56 which are curved outwardly and slightly reversely above the surrounding web portion 46 to prevent food particles from falling into the pockets 44. These rim portions 56 reinforce the receptacles 42 and provide a convenient gripping surface for inserting or removing the receptacles 42 and contents thereof from pockets 44 while at the same time providing an illusion of thickness for the edge of the receptacles. Thus, it can be seen that the receptacles 42 may be fabricated from a relatively inexpensive and flexible thermoplastic sheet material since they receive support from the pockets 44 in the tray member 40 and these receptacles may be removed from the tray and used as a disposable container for leftover food in the dish portions 52, thus permitting reuse of the tray member 12 without extensive cleaning.

In FIGURE 11 there is disclosed another embodiment of this invention similar to the embodiment illustrated in FIGURES 3–7. An adhesive 58 is placed between the adjacent surfaces of the receptacles 42 and pockets 44 to reduce the tendency for these components to be separated by sudden movements of the tray member 40. Desirably, the adhesive 58 may be of the ever-tacky type that has a greater adhesion to the pocket 44 of tray member 40 than to receptacles 42 so that when the receptacle is removed from the pocket 44 the adhesive will remain attached to the bottom wall 50 of pocket 44.

Depending upon the means of fabrication selected, the tray assembly may be made of a thermosetting material or a thermoplastic such as polyetheylene, nylon, polypropylene, filled polypropylene or impact polystyrene. As indicated previously, the tray member and cover or individual receptacles may be made easily and inexpensively from a thermoplastic material such as polypropylene which may be thermoformed into the desired configuration. Polypropylene is particularly suited for the tray member because of its relative stiffness, high tensile strength and load-bearing properties, abrasion-resistance, and heat-resisting properties. The cover or individual receptacles may be readily thermoformed into the desired configuration from a sheet or film of water-impermeable thermoplastic such as linear polyethylene, polypropylene or polycarbonate.

The thickness of the tray member may vary from about 15 to 70 mils depending upon the material selected and the degree of rigidity desired. However, about 40 to 50 mils is generally preferred. The web portion of the tray member may be corrugated or embossed and printed with an attractive design in the valleys of the corrugations or embossments and be thereby protected from surface abrasion. The tray member thus may be attractively made with an expensive design that is not subjected to scuffing and deterioration requiring frequent replacement because of protection by the ridges of the corrugations or embossments and the fact that detergents and high temperatures are not required to sterilize and remove food particles that have been disposed of in the removable cover or individual receptacles.

Similarly, the cover and individual receptacles may be made from a sheet or film of thermoplastic of between 2 and 20 mils that is relatively flexible compared to the rigid tray member. A thickness of between 2 to 6 mils may be used desirably for a relatively inexpensive cover and about 3-8 mils may be used desirably for the individual receptacles. The cover and individual receptacles are thus made readily from inexpensive film or sheet and may be disposed of after each use.

As previously indicated, the individual receptacles may be held in the pockets of the tray member by the weight of the individual receptacle and the food that may be therein. As sudden movements of the tray member may cause the individual receptacles to be jolted out of the pockets, an ever-tacky adhesive then may be interposed that has greater adhesion to the tray member than to the receptacles, so that when one receptacle is removed from a pocket, the adhesive remains in place to adhere to the next receptacle that is placed in the pocket and the adhesive may be reused several times in this manner, or vice-versa if so desired to facilitate cleaning of the tray member. A water-latex emulsion is particularly advantageous as an adhesive as it will firmly adhere to a surface-treated polyolefin such as polypropylene or polyethylene used to form a tray member, and when placed in a pocket thereof, will, after it has dried, not adhere as well to the surface of a receptacle placed in the pocket as it will adhere to the pocket itself.

In using static attraction, the individual receptacles may be engaged to the pockets of the tray member by forming the tray member of polypropylene which has a tendency to acquire a positive ionic charge on its surface, and forming the individual receptacles of polystyrene which has a tendency to acquire a negative ionic charge on its surface, thereby holding the individual receptacles in the pockets of the tray member by the attraction of the opposite ionic charges.

When the embodiment utilizing a flexible cover is employed, it may be desirable to provide a fine intersecting pattern of relatively shallow embossments over substantially the major portion, if not the entire, of the surface thereof. In this manner, the grooves formed thereby will minimize the formation of air pockets retarding conformation of the cover during application thereof to the tray member. Similarly, the air retained therein will avoid the formation of a vacuum-like bond between the tray member and cover to hinder removal. Such an embossed pattern also provides a highly desirably appearance to the cover member.

A novel tray assembly may thus be made by forming a compartmented tray member of relatively rigid synthetic plastic and a disposable, flexible food receptacle of synthetic plastic that may be conveniently and economically manufactured from thermoplastic sheet material. The receptacle is used as a disposable container for the leftover food remaining therein and the tray member may be reused with a minimum of cleaning so that the tray member need not be subjected to deterioration by detergents and high temperatures since it may be reused with a minimum of cleaning.

Having thus described the invention, I claim:

1. A tray assembly comprising an integrally formed tray member of relatively rigid synthetic plastic material having a substantially planar web portion and a plurality of pockets extending downwardly from said web portion with side and bottom walls, and an integrally formed removable cover of flexible plastic sheet material overlying said tray member, at least one of said tray member and said cover having embossments on its opposed surface providing grooves for passage of air therebetween to minimize formation of air pockets retarding conformation of said cover to said tray member, said cover also having a web portion and a plurality of food receiving dish portions extending into said pockets and conforming closely to the shape thereof, said side and bottom walls of said pockets of said tray member providing peripheral and underlying support for said dish portions of said cover and said web portion of said tray member providing underlying support for said web portion of said cover.

2. The tray assembly of claim 1 wherein said tray member is thermoformed from thermoplastic sheet material.

3. The tray assembly of claim 1 wherein said tray member and cover have interengaging portions.

4. The tray assembly of claim 1 wherein said tray member has an ionic charge on its upper surface and said cover has the opposite ionic charge on its lower surface to provide ionic attraction therebetween.

5. The tray assembly as in claim 1 wherein said tray member has an ever-tacky adhesive on its upper surface having greater adhesion to said tray member than to said receptacle.

6. The tray assembly of claim 1 wherein said tray member and cover are thermoformed from thermoplastic sheet material.

7. The tray assembly of claim 1 wherein said cover has a peripheral lip portion engaged with the peripheral edge of said tray member.

8. A tray assembly comprising an integrally thermoformed tray member of relatively rigid thermoplastic sheet material having a web portion substantially in one plane and a plurality of pockets extending downwardly from said web portion with side and bottom walls; and a disposable thermoformed cover of flexible thermoplastic sheet material of about 2 to 10 mils in thickness overlying said tray member, at least one of said tray member and said cover having embossments on its opposed surface providing grooves for passage of air therebetween to minimize formation of air pockets retarding conformation of said cover to said tray member, said cover also having a web portion overlying said web portion of said tray member and having a plurality of food-receiving dish portions therein extending into said pockets and conforming closely to the shape thereof, said side and bottom walls of said pockets providing peripheral and underlying support for said dish portions and said web portion of said tray member providing underlying support for said web portion of said cover, said cover having a peripheral lip portion flexibly engaged with the peripheral edge of said tray member.

9. The tray assembly of claim 8 wherein the upper surface of said web portion of said tray member is printed and said cover is transparent.

References Cited by the Examiner

UNITED STATES PATENTS

| | | | |
|---|---|---|---|
| 2,614,399 | 10/1952 | Roethel | 220—63 |
| 2,709,904 | 6/1955 | Boughton | 220—63 |
| 3,057,510 | 10/1962 | Blacker | 220—23.8 |
| 3,113,710 | 12/1963 | Meagher | 229—2.5 |

THERON E. CONDON, *Primary Examiner.*

J. B. MARBERT, *Assistant Examiner.*